(12) United States Patent
Ilmberger et al.

(10) Patent No.: US 8,291,932 B2
(45) Date of Patent: Oct. 23, 2012

(54) VALVE MEANS

(75) Inventors: Steffen Ilmberger, Gutlingen (DE); Volker Quendt, Unterensingen (DE); Tobias Danner, Ostfildern (DE)

(73) Assignee: Festo AG & Co. KG, Esslingen (DE)

( * ) Notice: Subject to any disclaimer, the term of this patent is extended or adjusted under 35 U.S.C. 154(b) by 666 days.

(21) Appl. No.: 12/288,337

(22) Filed: Oct. 17, 2008

(65) Prior Publication Data

US 2009/0101218 A1    Apr. 23, 2009

(30) Foreign Application Priority Data

Oct. 19, 2007  (DE) .......................... 10 2007 051 029

(51) Int. Cl.
*F16K 31/12* (2006.01)
*F16K 31/36* (2006.01)
(52) U.S. Cl. .............. 137/505.13; 137/469; 137/543.23; 137/512.3; 137/614.2
(58) Field of Classification Search ............... 137/512.3, 137/512, 529, 469, 494, 543.23, 505.13, 137/614.2; 251/118, 120
See application file for complete search history.

(56) References Cited

U.S. PATENT DOCUMENTS

| | | | | |
|---|---|---|---|---|
| 2,960,998 A * | 11/1960 | Sinker et al. | .................. | 137/542 |
| 2,962,045 A * | 11/1960 | Christensen | .................. | 137/509 |
| 3,559,678 A * | 2/1971 | Donner | .......................... | 137/535 |
| 4,161,996 A * | 7/1979 | Dolejsi | .......................... | 181/230 |
| 4,353,684 A * | 10/1982 | Christman | .................... | 417/388 |
| 6,125,822 A * | 10/2000 | Janik et al. | .................... | 123/457 |
| 6,651,696 B2 * | 11/2003 | Hope et al. | .................... | 137/540 |
| 6,708,715 B2 * | 3/2004 | Duebel et al. | ................. | 137/102 |
| 6,899,199 B2 * | 5/2005 | Sageman | ...................... | 181/237 |
| 7,104,060 B2 * | 9/2006 | Ogawa et al. | ................... | 60/597 |

* cited by examiner

*Primary Examiner* — Stephen M Hepperle
*Assistant Examiner* — Seth Faulb
(74) *Attorney, Agent, or Firm* — Hoffmann & Baron, LLP (57) ABSTRACT

A valve means has a valve housing, in which an inlet duct for pressure fluid extends, the duct opening into a valve chamber, in which a valve member is held by spring means in a closed position engaging a valve seat, the valve member opening at a predetermined opening pressure of the pressure fluid present so that pressure fluid arrives by way of an opening cross section at a fluid outlet and flows from it, and the valve means comprises a control duct by way of which pressure fluid flows into a control chamber, in which a control member is held clear of a control seat by spring means in an open position, the control chamber being connected by way of a connecting duct with the valve chamber; and in which the control member so controls the exit flow of the pressure fluid that the control member is able to be shifted, prior to opening of the valve member at a control pressure below the opening pressure into engagement with its control seat so that the passage of fluid between the control chamber and the valve chamber is shut off and that in the open position of the valve member and during exit flow of the pressure fluid via the control chamber the control member, with a fall in pressure below the control pressure, shifts into its open position and the connection duct is opened with the result that pressure fluid can leave via the control chamber.

10 Claims, 8 Drawing Sheets

VALVE MEANS

CROSS-REFERENCE TO RELATED APPLICATION

This application claims priority based on German Patent Application No. 10 2007 051 029.4 filed on Oct. 19, 2007, which is incorporated herein by reference.

BACKGROUND OF THE INVENTION

1. Field of the Invention

The invention relates to a valve means comprising a valve housing, in which an inlet duct for pressure fluid extends, said duct opening into a valve chamber, in which a valve member is urged by spring means in a closed position engaging a valve seat, the valve member opening at a predetermined opening pressure of the pressure fluid present so that pressure fluid arrives by way of an opening cross section at a fluid outlet and flows out from it.

2. Brief Description of the Related Art

Valve means are also termed relief valves and have long been used. For example such a relief valve is disclosed in the British patent publication GB 1 477 238 having an inlet connected with a first pressure chamber. The pressure chamber is closed by a valve member held in its closed position by spring means engaging a valve seat. If an opening pressure is reached, the valve member is lifted from its seat so that the first pressure chamber is connected with an outlet chamber whence the fluid under pressure may flow out.

The U.S. Pat. No. 5,050,637 also shows such a relief valve.

Relief valves are provided for systems to let off fluid medium when the operating pressure exceeds the permissible level and the medium is discharged by the valve opening to lower the pressure. In addition the rapid opening with a sufficient opening cross section for a sufficiently rapid fall in pressure the act of closing the relief valve is important. In the case of conventional relief valves the closing characteristic can not be altered so that the relief valve has the disadvantage of closing relatively late, something entailing an undesired pressure drop in the system. Late closure of the relief valve is more especially entailed when the valve member is opened the pressure fluid acts at a larger area than is the case with the valve member closed with the consequence that a hold pressure, which is below the opening pressure, is sufficient to keep the valve member in its open position. It is only when this hold pressure is no longer reached that the valve closes again.

SUMMARY OF THE INVENTION

One aim of the invention is accordingly to provide a valve means of the type initially mentioned with which the closing characteristic of the valve means may be influenced and more especially renders possible a rapid closure of the valve member.

This object is to be achieved by a valve means with the features of the independent claim 1. Further developments of the invention are recited in the dependent claims.

The valve means in accordance with the invention is characterized in that there is a control duct connected with the inlet duct, by way of which pressure fluid flows into a control chamber, wherein a control member is held clear of a control seat by spring means in an open position, the control chamber being connected by way of a connecting duct with the valve chamber and in which the control member so controls the exit low of the pressure fluid that the control member is able to be shifted, prior to opening of the valve member at a control pressure below the opening pressure into engagement with its control seat so that the passage of fluid between the control chamber and the valve chamber is shut off and that in the open position of the valve member and during exit flow of the pressure fluid via the valve chamber the control member, upon a fall in pressure below the control pressure, shifts into its open position and the connection duct is opened with the result that pressure fluid can leave via the control chamber.

The control member consequently has a function taking place before the action of the valve member, that is to say before the valve member opens, the control member shuts off the passage of fluid through the control chamber and before the valve member closes the passage of fluid between the valve chamber and the control chamber is opened so that the pressure fluid may leave via the control chamber as well. Owing to the control member the closing characteristic of the valve member may be influenced, to wit in such a manner that with the control member in the open position an additional drop in pressure via the occurs so that the fluid pressure holding the valve member in its open position is rapidly reduced and the valve member may rapidly close.

In the case of a further development of the invention the opening cross section relevant for the exit flow rate of the pressure fluid is defined by a gap between the outer wall of the valve member and the inner wall of the valve chamber. The inner wall of the valve chamber and the outer wall of the valve member may be so matched to each other that the valve member is able to be set in several open positions with different opening cross sections, in which it can be held. For example it is possible for the valve member firstly to open with a smaller opening cross section with the result that initially less pressure fluid will leave. Should a certain back pressure act on the valve member, the latter may then be shifted into its widest open position and held in it. It is however also possible for the opening characteristic of the valve member to be so set that complete opening to the maximum opening cross section is reached as quickly as possible.

In a particularly preferred manner the valve member may possess a terminal portion tapering toward the valve seat so corresponding to a valve chamber terminal portion, tapering in relation to the rest of the valve chamber, so that with the valve member moved clear of the valve seat and a position of the valve chamber terminal portion within the valve chamber terminal region, a small opening cross section is open and at a position of the valve chamber terminal portion outside the valve chamber terminal region there is a larger opening cross section.

In the case of a further development of the invention the control duct branches off the inlet duct. Alternatively it is possible for the control duct to have its own inlet and for the branching to take place externally.

In a particularly preferred fashion the valve means possesses a muffler for the fluid outlet, which as pressure fluid is leaving builds up a back pressure aiding the closing movement of the valve member. Accordingly a pressure surge directed in the closing direction of the valve member may be generated.

In the case of a further development of the invention a first valve member face A1, on which the pressure fluid acts in the closed position of the valve member, is smaller than a control member face A2 which is subject to pressure fluid supplied via the control duct.

Preferably the face ratio A1/A2 is approximately 1:3.

In the case of a further development of the invention the valve member has a base portion differing from the cross sectional shape of the valve chamber, several outlet ducts for the pressure fluid being formed between the outer wall of the base portion and the inner wall of the valve chamber.

It is particularly preferred from the valve member and/or the control member to be designed like plungers.

A preferred working example is illustrated in the drawings and will be explained in the following account in detail.

DETAILED DESCRIPTION OF THE EMBODIMENTS

FIGS. 1 through 6 represent a preferred working example of the valve means 11 in accordance with the invention.

Figure 1:
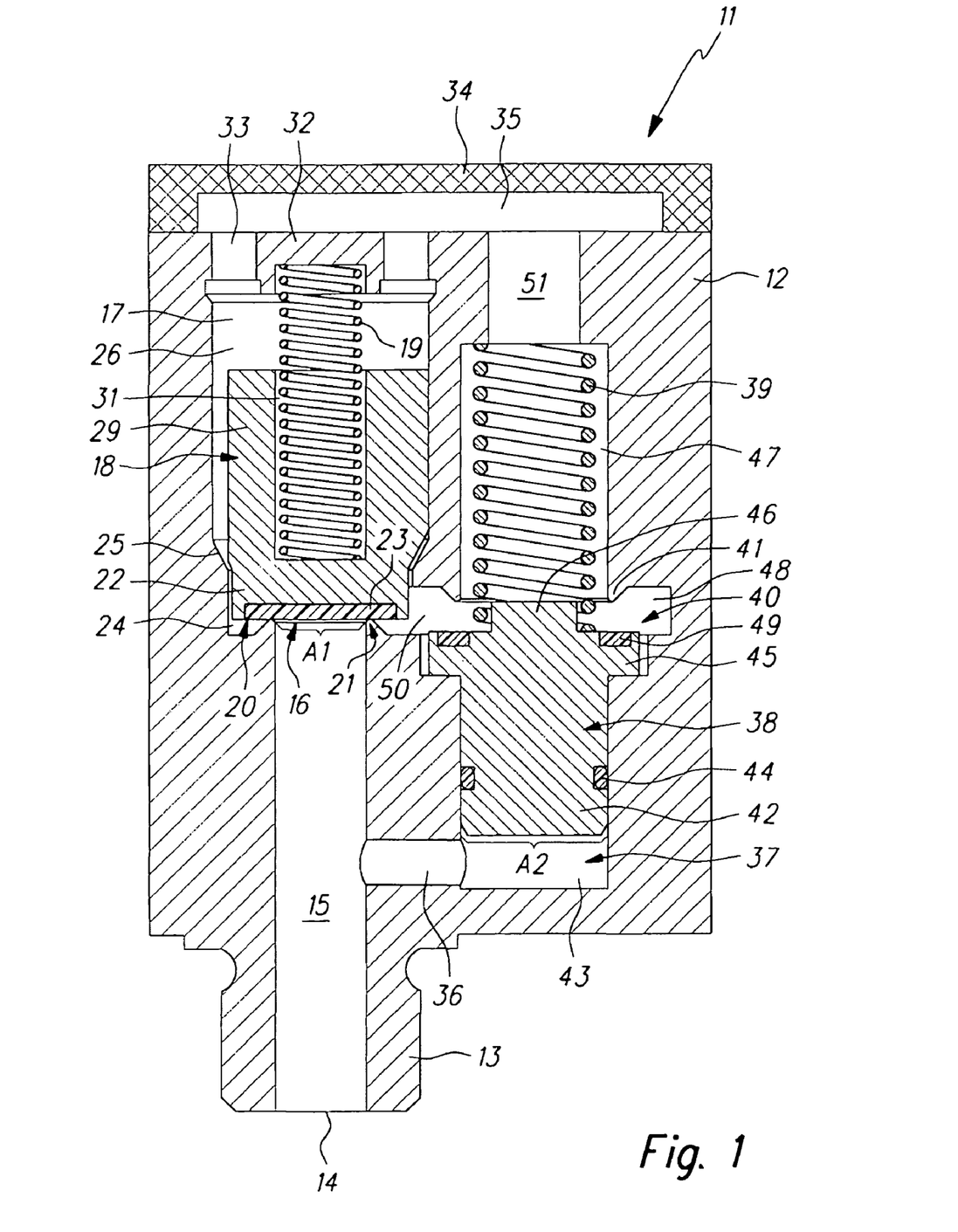
FIG. 1 is a longitudinal section taken through a preferred working embodiment of the valve means in accordance with the invention with the valve member in the closed position and the control member in the open position.
Figure 2:
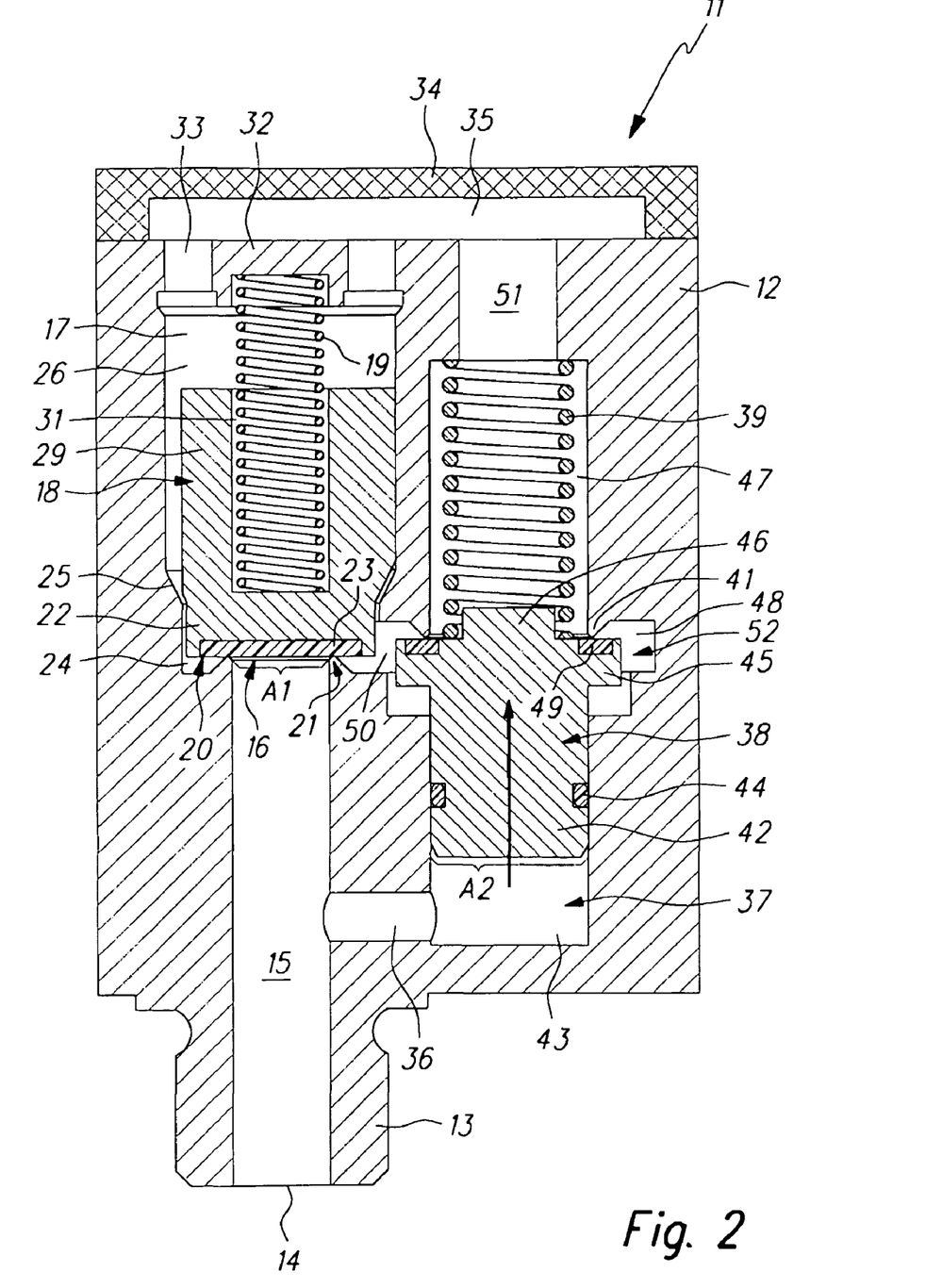
FIG. 2 shows the valve means of FIG. 1 with the valve member in the closed position and the control member in the closed position.

The valve means 11 possesses a valve housing 12 on whose bottom side there is a connection part 13, possibly provided with a thread, for connection with a system operating with a pressure fluid or subject to a pressure fluid. Preferably compressed air is employed as a pressure fluid. However other gaseous or liquid mediums may be utilized. In the following the workings will however be described as an example on the basis of use of compressed air.

At the connection part 13 there is an inlet opening 14 via which the compressed air may flow into a downstream inlet duct 15.

The inlet duct 15 opens via a valve chamber opening 16 into a valve chamber 17.

In the valve chamber 17 there is a valve member 18 in the form of a plunger, which is held in a closed position 20 by spring means 19 to engage a valve seat 21. The valve seat 21 is located directly at the valve chamber opening 16 and is constituted in this case by a small hump.

Figure 7:
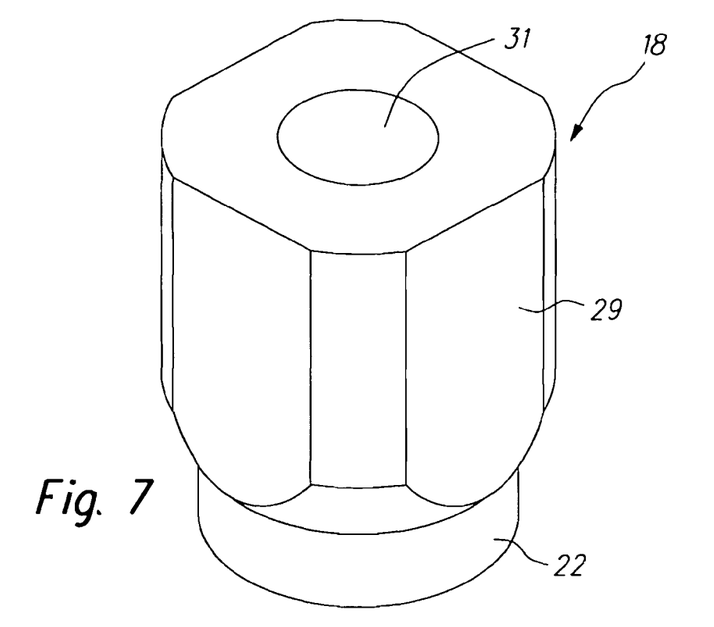
FIG. 7 shows a first working embodiment of the valve member of the valve means.
Figure 8:
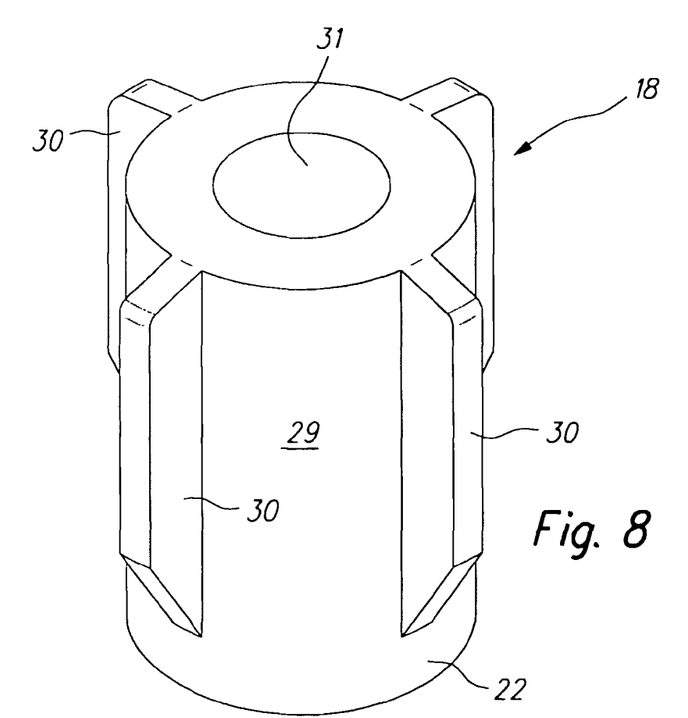
FIG. 8 shows a second working example of the valve member of the valve means.

As is more especially to be seen in FIGS. 7 and 8 the valve member 18 possesses a terminal portion 22 tapering toward the valve seat 21, as for example in a cylindrical form. On the bottom side of the terminal portion 22 a sealing element 23, for example in the form of a seal washer, is placed which in the closed position of the valve member 18 effects a fluid-tight sealing of the valve chamber opening 16.

The terminal portion 22 of the valve member 18 corresponds to a valve chamber terminal region 24, which is tapered in relation to the rest of the valve chamber 17, such terminal region more particularly also having a basic cylindrical shape. Adjoining the terminal region 24, in a direction away from the valve seat 21, of the valve chamber there is a conical transitional portion 25, which merges into a base region 26 (FIG. 1), which is also essentially cylindrical, of the valve chamber 17.

Figure 3:
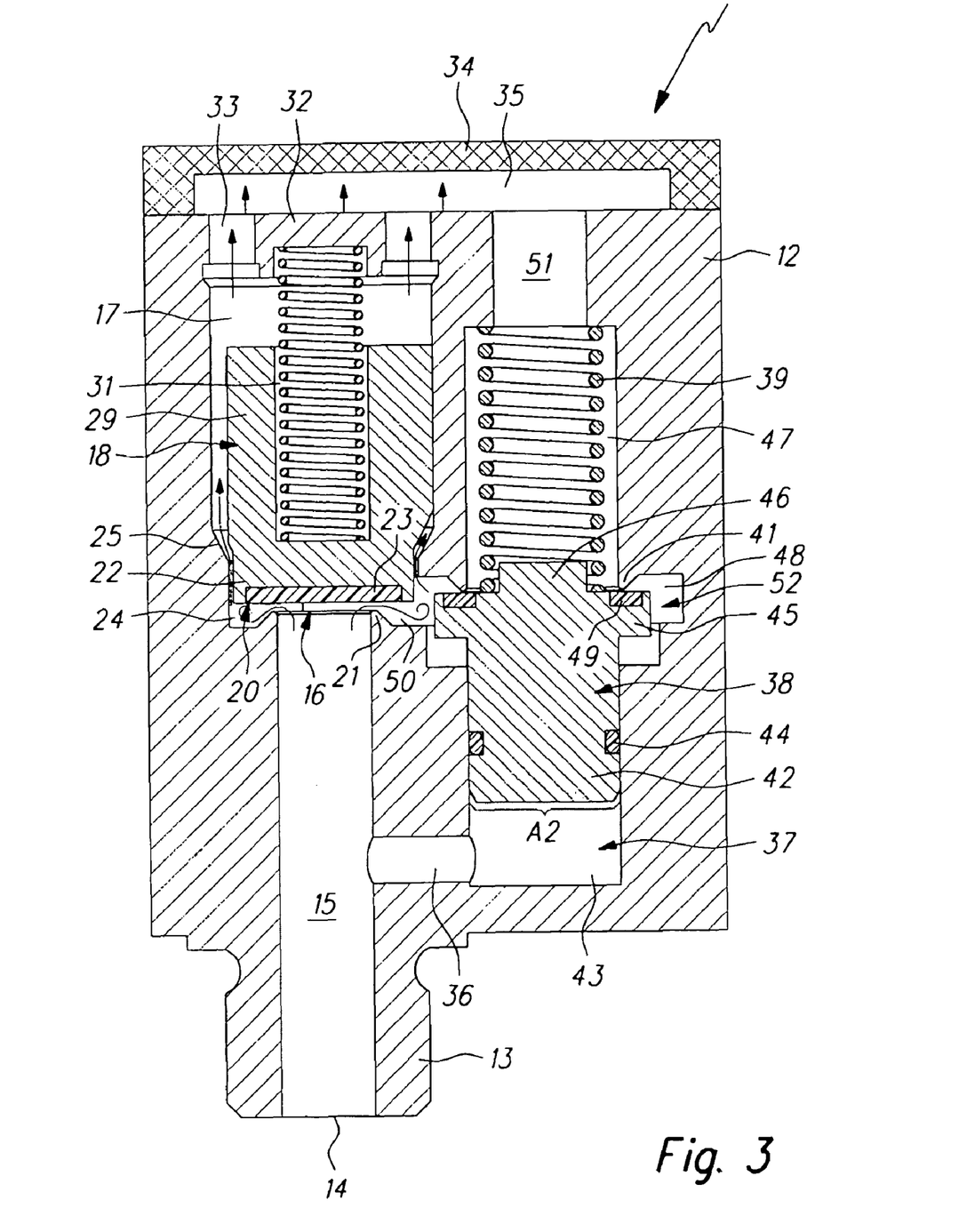
FIG. 3 shows the valve means of FIG. 1 with the valve member in the open position at a small opening cross section and the control member in the closed position.
Figure 3A:
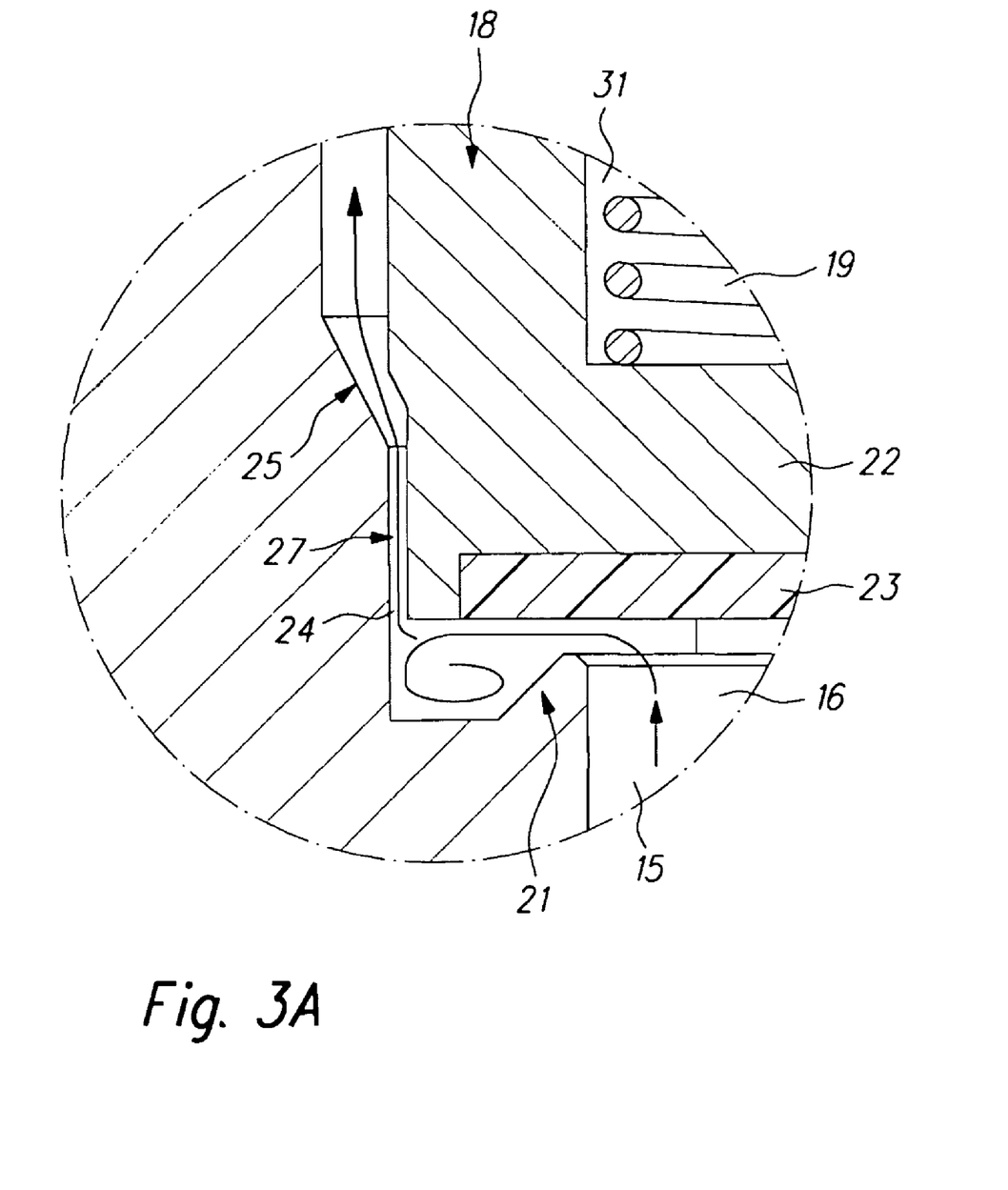
FIG. 3a shows a detail X of FIG. 3 on a larger scale.

As more especially represented in FIG. 3a between the outer portion 22 and the inner wall of the valve chamber terminal region 24 there is a gap with a small cross section, if the terminal portion 22 is fitted into the valve chamber terminal region 24. This gap constitutes a first choke means 27 for the exiting compressed air. If the terminal portion 22 of the valve member 18 has its bottom side clear of the valve chamber terminal region 24, i. e. for example at the conical transition portion 25 as represented for example in FIG. 4, between the bottom edge of the terminal portion 22 and the inner wall of this conical transitional portion 25 a larger cross section will also be opened, which serves as a second choke means 28 for the exiting compressed air.

The valve member 18 furthermore possesses a base portion 29 differing in its cross section from the valve chamber 17. The base portion may for example, as illustrated in FIG. 7, have a rectangular or, respectively, square basic shape possibly with rounded corners. Since the valve chamber 17 is cylindrical in its configuration, between the four sides of the rectangular or, respectively, square portion 29 and the inner wall of the valve chamber outlet ducts are formed, via which the compressed air may leave. Another design is depicted in FIG. 8, in which the base portion 29 possesses ribs 30 extending radially outward from the outer side of a cylindrical valve member 18. The regions between the individual ribs 30 are spaced from the inner wall of the valve chamber 17 so that here as well outlet ducts are formed for the compressed air. FIGS. 7 and 8 furthermore show that the base portion 29 merges conically, or with a conical outline (FIG. 8), with the respective terminal portion 22.

The base portion 29 furthermore possesses a central opening 31, like a blind hole, with a cylindrical configuration, in which the spring means 19, more especially in the form of a helical spring, is placed. The helical spring bears against the floor of the opening 31. Furthermore the helical spring protrudes from the opening 31 and adjacent to other end bears against a counter abutment 32 formed on the top side of the valve chamber 17. On the top side of the valve chamber 1 there is furthermore a fluid outlet 33, for example in the form of two outlet openings via which compressed air may leave. The fluid outlet 33 is furthermore provided with a muffler 34, belonging to the valve means 11, which has a muffler chamber 35 in which the exiting compressed air firstly enters before it flows out in the surroundings if appropriate.

The valve means furthermore has a control duct 36, which branches off to the side of the inlet duct 15 and opens into a control chamber 37. In the control chamber 37 there is a control member 38 which in an open position 40 is held clear of a control seat 41 by spring means 39. The control member 38 is also designed in the form of a plunger and possesses a base part 42 which is guided in a base region 43 of the control chamber 37 with a seal element 44, for example in the form of an O ring, between it and the inner wall of the base region to ensure a fluid-tight sealing effect.

The base part 42 of the control member 38 is adjoined by a head part 45, which is made wider than the base part 42 in cross section. The head part 45 is designed like a flange and on its top side has a guide pin 46 projecting upward from the head part 45 and on which the spring means 39, more particularly in the form of a helical spring, are seated. The helical spring accordingly bears at the top side against the top side of the head part 45. Radially clear of the helical spring there is a sealing element 49, as for example in the form of a sealing ring, which is able to be shifted while in fluid-tight engagement with the control seat 41, the control seat 41 for its part being in the form of a small hump on the bottom side of a middle part 47 of the control chamber 37, essentially accommodating the helical spring. Between the middle part 47 and the base part 42 of the control chamber 37 there is a control portion 48 of the configuration chamber 37 serving to receive the head part 45 of the control member 38.

The valve chamber 17 and the control portion 38 of the control chamber 37 are joined together by means of a connecting duct 50 with each other. Finally there is an outlet part 51 on the top side of the control chamber 37 by way of which the compressed air may leave on its way to the muffler 34.

FIG. 1 shows the initial position of the valve member 18 or, respectively, of the control member 38 if no gage pressure must be built up in the system connected with the valve means 11. In this situation the valve means 11 is as it were without any function. The valve member 18 is in this case thrust against the associated valve seat 21 by way of the spring means 19 so that the valve chamber opening 16 is shut off in fluid-tight fashion. In this condition compressed air acts at a valve member face A1 on the valve member. However the pressure obtaining is not sufficient to open the valve member 18. Simultaneously compressed air, flowing via the control duct 36, is present at the bottom side of the control member 38 at a control member face A2. The control member 38 is lifted by the spring force of the spring means 39 from the associated control seat 41. The control member face A2 is larger than the valve member face A1 and for example the ratio A1/A2 will be approximately 1:3.

If the pressure rises firstly the control member 38 will be thrust by the spring force of the spring means 39 against its associated control seat 41 so that the passage of fluid to the middle part 47 and to the outlet part 51 of the control chamber 37 is shut off in a fluid-tight manner. The control member will assume its closed position 52 depicted in FIG. 2. Although the same pressure obtains at the first valve chamber face A1 and the control member face A2, the control member 38 will be actuated, owing to the larger control member face A2 or area and to the higher force involved, before the valve member 18.

If the pressure now increases further and reaches an opening pressure level, the valve member 18 will be lifted clear of the associated valve seat 21 against the force of the spring means 19. This situation is depicted for example in FIG. 3 or, respectively, FIG. 3A. The valve member 18 is firstly so lifted from the valve seat 21 that the terminal portion 22 of the valve member dwells in the terminal portion 24 of the valve chamber. I. e. compressed air will firstly flow through a relatively small opening cross section by way of the so-called first choke means 27 between the outer wall of the terminal portion 22 and the inner wall of the terminal portion 24 of the valve chamber.

If the pressure increases further, then owing to the first choke means 27 there will be a back pressure in the space underneath the second valve member face A3. Owing to this back pressure, which acts on the larger and preferably decidedly larger, valve member face A3 (in contrast to the first valve member face A1) there will be a substantially greater force acting on the valve member 18 and it will shift rapidly away from the valve seat 21. The valve member 18 is at this time shifted into the open position 53, in which owing to the geometry of the inner wall of the valve chamber and the outer wall of the valve member a larger opening cross section will result as an annular gap so that more compressed air may leave or, respectively, there will be a greater flow.

Figure 4:
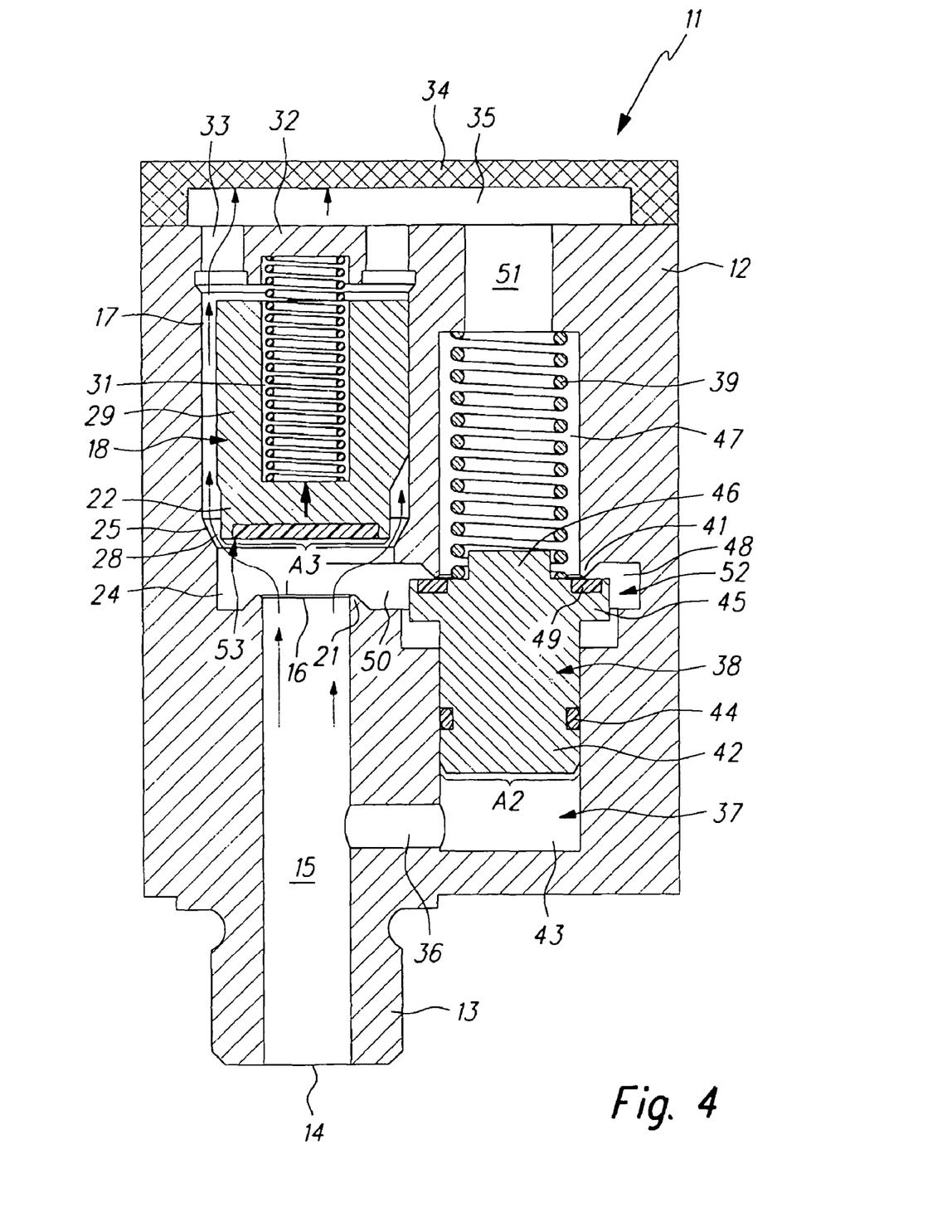
FIG. 4 shows the valve means of FIG. 1 with the valve member in the open position at a large opening cross section and the control member in the closed position.
Figure 5:
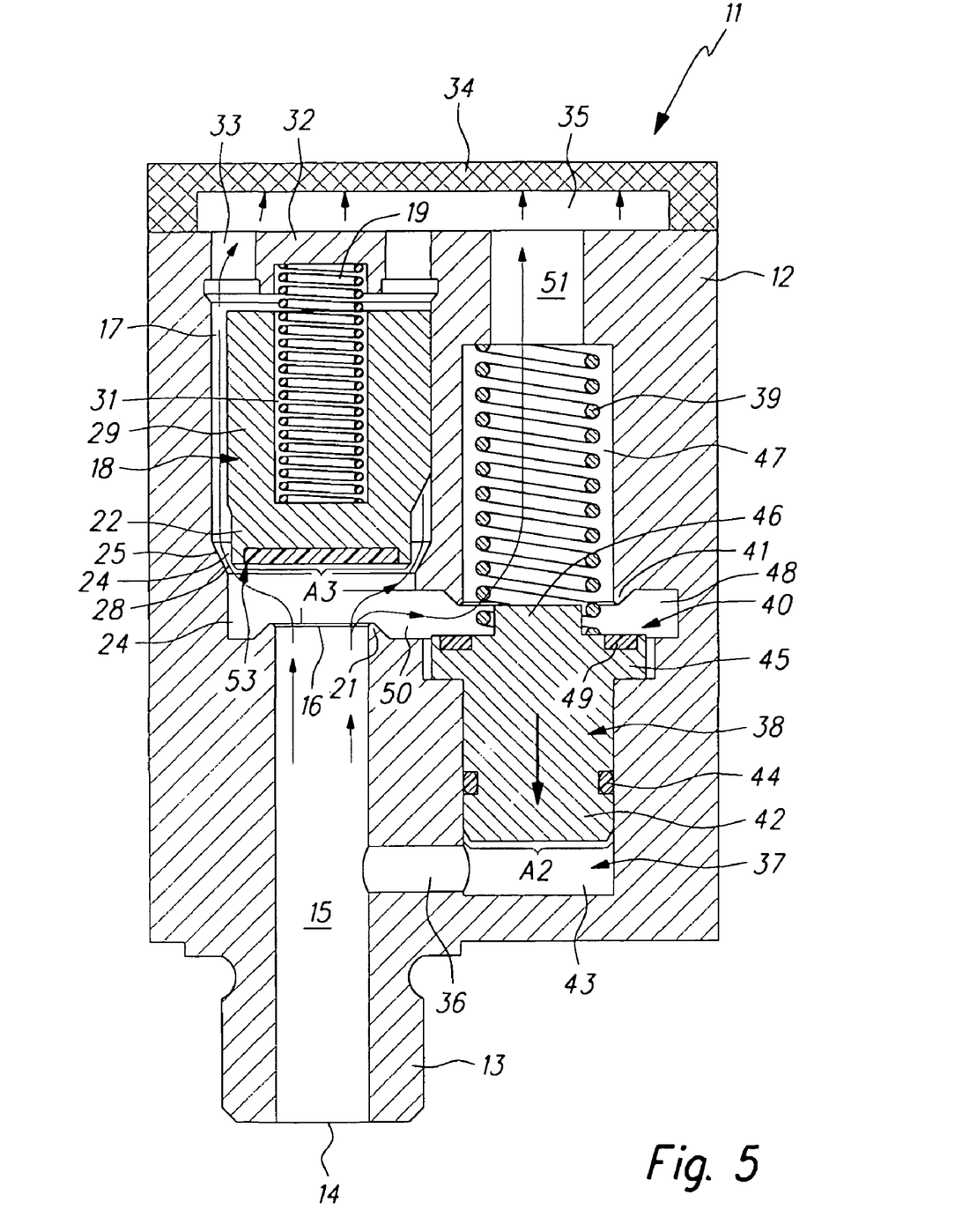
FIG. 5 shows the valve means of FIG. 1 with the valve member in the open position and the control member in the open position.
Figure 6:
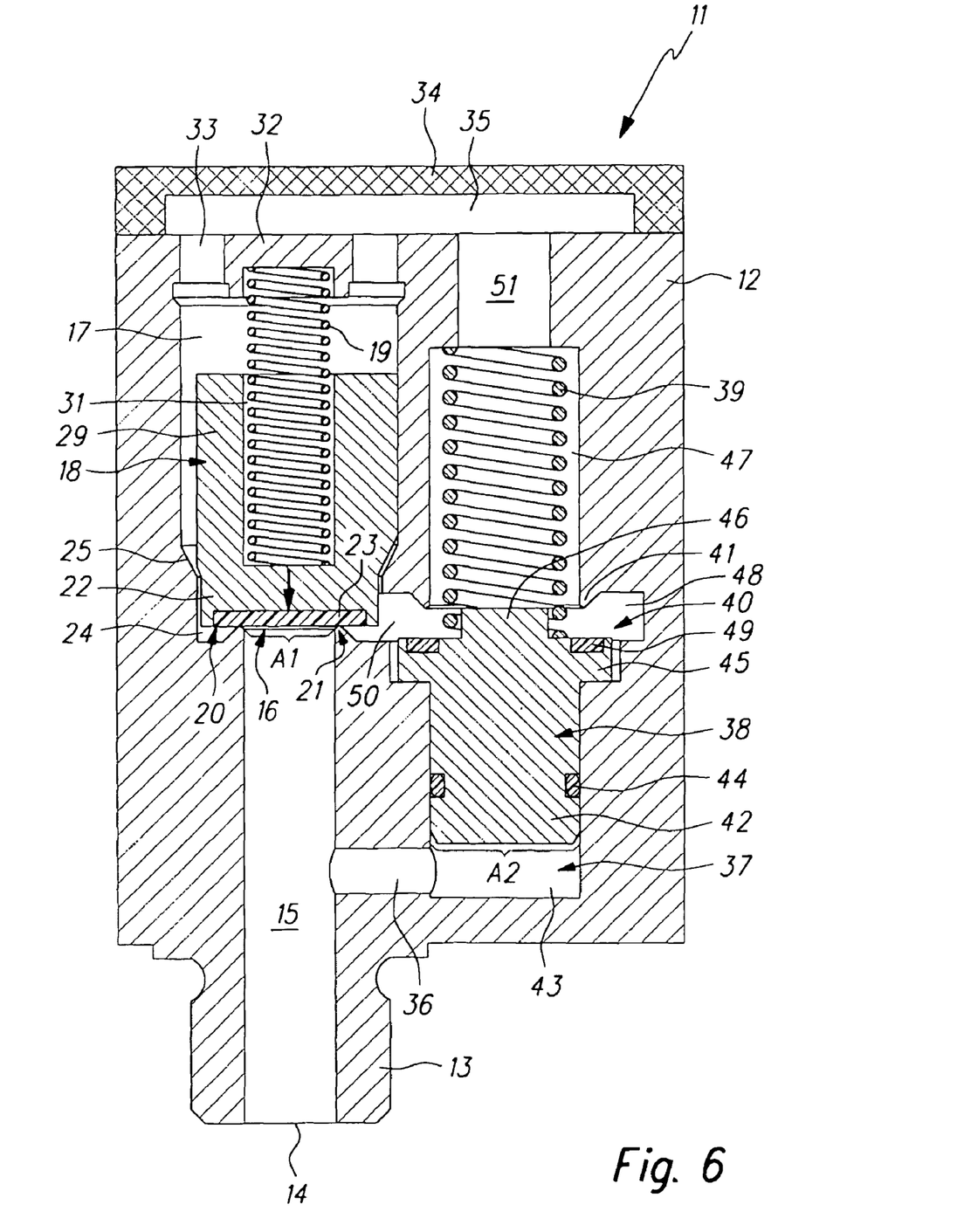
FIG. 6 is a showing identical to that of FIG. 1, the valve member having returned back to its closed position.

The valve member 18 may therefore snap out of the terminal region 24, for example into the position illustrated in FIG. 4 within the conical transitional portion 25, a larger opening cross section being formed. In this situation exiting compressed air will act at a second valve member face A3, which is larger than the first valve member face A1. Accordingly in this situation a force, which owing to the larger second valve member face A3 is greater, will hold the valve member 18 in its open position illustrated in FIG. 4. At the control member there will have been no change in the situation and the member will still be held by the control pressure action on the bottom side of the base part 42 in engagement with its own control seat 41. In this situation the connecting duct between the valve chamber 17 and the control portion 48 of the control 37 is shut off.

In the state of the valve member 18 the associated system will be vented with the result that the pressure drops. The lower pressure is however sufficient, owing to the larger second valve member face A3 and the greater holding force resulting from it, to keep the valve member 18 in its open position 53. In the case of conventional relief valves the pressure would therefore have to drop further until closure of the valve member 18 occurs. In the case of the valve means 11 in accordance with the invention on the other hand the control member 38 is, when the control pressure at the base part 42 of the control member 38 gets too low, lifted back off the associated control seat 41 owing to the force of the spring means 39. Accordingly compressed air may via the connecting duct 50 get to the control chamber 37 so that in addition to venting by way of the valve chamber 17 venting will occur by way of the control chamber 37. Simultaneously a back pressure will build up in the muffler chamber 35 which acts in the closing direction of the valve member 18. Owing to the additional venting by the configuration chamber 37 the valve member will travel substantially faster back into its closed position 20 with the result that an undesired drop in the pressure in the adjoining system may be avoided. The venting action via the control chamber 37 consequently means that rapid closure of the valve member 18 may be ensured. The valve member 18 accordingly returns to its closed position 20 illustrated in FIG. 6.

What is claimed is:

1. A valve means comprising a valve housing, in which an inlet duct for pressure fluid extends, said duct opening into a valve chamber, in which a valve member is urged by spring means in a closed position engaging a valve seat separating the inlet duct from the valve chamber, the valve member being movably disposed between the valve seat and a fluid outlet and opening at a predetermined opening pressure of the pressure fluid present so that pressure fluid arrives by way of an opening cross section at the fluid outlet and flows out from it, the valve means comprising a control duct connected with the inlet duct upstream of the valve chamber, by way of which pressure fluid flows into a control chamber, in which a control member is held clear of a control seat by spring means in an open position, the control chamber being connected by way of a connecting duct with the valve chamber and in which the control member so controls the exit flow of the pressure fluid that the control member is able to be shifted, prior to opening of the valve member at a control pressure below the opening pressure into engagement with its control seat so that the passage of fluid between the control chamber and the valve chamber is shut off and that in the open position of the valve member and during exit flow of the pressure fluid via the valve chamber the control member, upon a fall in pressure below the control pressure, shifts into its open position and the connection duct is opened with the result that pressure fluid can leave via the control chamber, wherein the opening cross section determining the outlet flow rate of the pressure fluid is defined by a gap between the outer wall of the valve member and the inner wall of the valve chamber, and wherein the inner wall of the valve chamber and the outer wall of the valve member are so matched to each other that the valve member may be shifted into a plurality of open positions with differing opening cross sections and may be held in such positions.

2. The valve means in accordance with claim 1, wherein the valve member possesses a terminal portion tapering toward the valve seat, such terminal portion so corresponding to a valve chamber-terminal portion tapered in relation to the rest of the valve chamber that when the valve member is off the valve seat and in a position of the terminal portion of the valve member within the valve chamber-terminal portion a small opening cross section is opened and in a position of the terminal portion of the valve member outside the valve chamber-terminal portion an opening cross section is open which is larger than it.

3. The valve means in accordance with claim 1, wherein the control duct branches off the inlet duct.

4. The valve means in accordance with claim 1, wherein the valve means comprises a muffler associated with the fluid outlet and adapted to cause, during the exit of pressure fluid, a back pressure aiding the closing motion of the valve member.

5. The valve means in accordance with claim 1, wherein a first valve member face, at which the pressure fluid acts in the closed position of the valve member is smaller than a control member face, at which pressure fluid, supplied via the control duct, acts at the control member.

6. The valve means in accordance with claim 5, wherein a face ratio of the first valve member face to the control member face is about 1:3.

7. The valve means in accordance with claim 1, wherein the valve member has a base portion departing from the cross sectional form of the valve chamber and between the outer wall of the base portion and the inner wall of the valve chamber a plurality of outlet ducts are formed for pressure fluid.

8. The valve means in accordance with claim 1, wherein at least one of the valve member and the control member are plunger-like in configuration.

9. A valve comprising:
   a valve housing defining an inlet duct for pressure fluid, a valve chamber communicating with said inlet duct, a valve seat formed between said inlet duct and said valve chamber, a fluid outlet in communication with said valve chamber, a control duct connected with said inlet duct, a control chamber communicating with said control duct, a control fluid outlet in communication with said control chamber, a control seat formed between said control chamber and said control fluid outlet and a connecting duct connecting said valve chamber with said control chamber;
   a valve member disposed in said valve chamber;
   a spring disposed in said valve chamber for urging said valve member against said valve seat in a closed position, said spring allowing the lifting of the valve member off the valve seat at a predetermined opening pressure of the pressure fluid present so that pressure fluid arrives by way of an opening cross section at said fluid outlet and flows out from said fluid outlet;
   a control member disposed in said control chamber;
   a control member spring for urging said control member clear of said control seat in an open position; and
   a muffler defining a muffler chamber in fluid communication with both of said fluid outlet and said control fluid outlet such that fluid flowing into said muffler chamber from said control fluid outlet will create a back pressure acting on said control member,
   wherein the control member so controls the exit flow of the pressure fluid that the control member is able to be shifted, prior to opening of the valve member, at a control pressure below the opening pressure, into engagement with said control seat so that the passage of fluid between said control chamber and said valve chamber is shut off and that, in the open position of said valve member and during exit flow of the pressure fluid via said valve chamber, said control member, upon a fall in pressure below the control pressure, shifts into its open position and said connection duct is opened with the result that pressure fluid can leave via said control chamber.

10. A valve comprising:
   a valve housing defining an inlet duct for pressure fluid, a valve chamber communicating with said inlet duct, a valve seat formed between and separating said inlet duct and said valve chamber, a fluid outlet in communication with said valve chamber, a control duct connected with said inlet duct upstream of said valve chamber, a control chamber communicating with said control duct, a control fluid outlet in communication with said control chamber, a control seat formed between said control chamber and said control fluid outlet and a connecting duct connecting said valve chamber with said control chamber;
   a valve member disposed in said valve chamber between said valve seat and said fluid outlet;
   a spring disposed in said valve chamber for urging said valve member against said valve seat in a closed position, said spring allowing the lifting of the valve member off the valve seat at a predetermined opening pressure of the pressure fluid present so that pressure fluid arrives by way of an opening cross section at said fluid outlet and flows out from said fluid outlet;
   a control member disposed in said control chamber; and
   a control member spring for urging said control member clear of said control seat in an open position;
   wherein the control member so controls the exit flow of the pressure fluid that the control member is able to be shifted, prior to opening of the valve member, at a control pressure below the opening pressure, into engagement with said control seat so that the passage of fluid between said control chamber and said valve chamber is shut off and that, in the open position of said valve member and during exit flow of the pressure fluid via said valve chamber, said control member, upon a fall in pressure below the control pressure, shifts into its open position and said connection duct is opened with the result that pressure fluid can leave via said control chamber, and
   wherein fluid does not flow through said control member when said control member is in its open position.

* * * * *